Feb. 12, 1952 A. M. SILVERMAN 2,585,352
LENS MOUNTING FOR SPECTACLES AND EYEGLASSES
Filed April 11, 1950
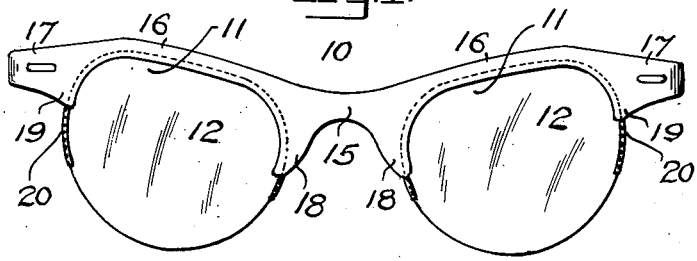
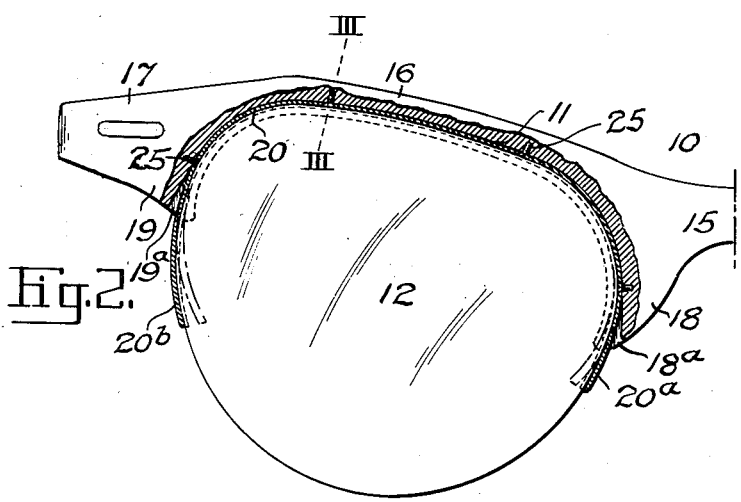
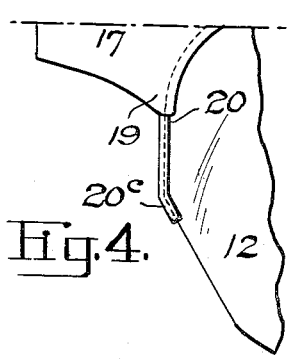
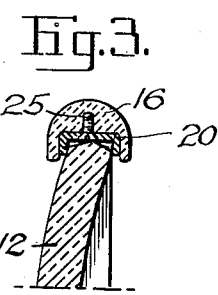
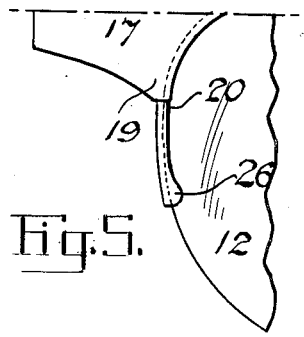
ALLAN M. SILVERMAN
INVENTOR
BY
ATTORNEY Patented Feb. 12, 1952

2,585,352

UNITED STATES PATENT OFFICE 2,585,352

LENS MOUNTING FOR SPECTACLES AND EYEGLASSES

Allan M. Silverman, Philadelphia, Pa.

Application April 11, 1950, Serial No. 155,236

3 Claims. (Cl. 88—47)

My invention relates to ophthalmic mountings and comprises an improved form of supporting and retaining means for the lenses of spectacles and/or eye-glasses.

One object of my invention is to combine with a plastic structure extending across the upper portion of the lenses only, spring tension members that will support and retain the lenses with such plastic structure in such manner as to leave the lower part of each lens entirely free; thereby insuring that a downward glance by the wearer will not be obscured by any frame portion or supporting part.

A further object of my invention is to provide a mounting that will support and retain a lens in proper position without the necessity of aperturing the lens for the reception of retaining screws, or of notching the edge (or edges) of the lens for engagement with complemental supporting lugs or the like.

A further object of my invention is to provide simple and efficient means for supporting and retaining the lenses securely in place and at the same time permitting easy removal when, for instance, the wearer may desire to substitute other lenses of any character, tinted or of other type, for the normal sight-improving lenses originally mounted.

And a still further object of my invention is to reduce to a minimum the size or extent of the plastic portion of the frame which is disposed at the upper portion of the lenses only.

My invention comprises supporting and retaining members of spring metal anchored in the recessed portions of the plastic frame receiving the lenses and in the main concealed by such frame portions; such spring metal retaining and supporting members having portions extending below the plastic frame for engagement with the lateral edge portions of the lenses.

These and other features of my invention are more fully set forth hereinafter; reference being had to the accompanying drawings, more or less diagrammatic in character, in which:

Figure 1 is a front elevation of a pair of spectacles, eye-glasses, or the like, having my improved lens retaining and supporting means.

Fig. 2 is an enlarged view of a portion of the structure illustrated in Fig. 1, partly in section, showing the spring tensioned supporting and retaining member forming the subject of my invention disposed in a lens receiving recess of such frame, and one form of means for securing such member in place.

Fig. 3 is an enlarged sectional view taken on the line III—III, Fig. 1, showing the position of the spring metal retaining and supporting member with respect to the grooved wall portion of the plastic frame, and securing means for fastening such spring member in place.

Figs. 4 and 5 illustrate modified constructional details within the scope of my invention.

Referring to the drawings, Fig. 1 shows a front elevation of a pair of spectacles, eye-glasses, or the like, having my improved mountings for retaining and supporting the lenses thereof. These mountings have been combined with a skeletal frame structure, which may be composed of a suitable plastic, indicated generally at 10; such frame having recesses 11 for the reception of lenses 12. The lenses may be of any desired shape or contour with the walls of the recesses receiving the same conforming generally to lens shape. My improved spring metal members for supporting and retaining the lenses in place are anchored in the skeletal frame within the walls of the lens-receiving recesses; such walls being grooved and the greater part of the retaining and supporting members being concealed by these walls.

The plastic frame portion may be of slight extent, disposed above the upper portions of the lenses only, and such frame may comprise a nose-bridge portion 15, lateral extensions forming the upper wall portions of the recesses 11 receiving the lenses, and the side portions 17 to which the bows or temples (not shown) are attached. The lateral wall extensions have integral depending portions 18 disposed adjacent to the nose-bridge 15, and other depending portions 19, also integral adjacent to the side extensions 17.

The parts 16, 18 and 19 together provide the walls of the recesses receiving the upper portions of the lenses, and these wall portions are internally grooved in any usual manner, such as provided in other plastic frame structures, to receive the lenses. As will be observed, the depending portions 18 and 19 are short and in themselves cannot afford proper support for a lens.

For the purpose of supporting and retaining the lenses in proper position in the recesses of the skeletal frame, I mount in the grooves of the walls providing the lens recesses, spring metal inserts 20, which are also slightly grooved to receive the beveled edges of the lenses, as indicated in Fig. 3. These spring metal inserts are of a shape exactly conforming to the upper contour of the lenses, and preferably to the contour of the recesses of the skeletal frame. Slight inequalities in this latter contact are not important, since the greater part of the metal insert is concealed by the plastic walls of the frame, but it is important that the metal inserts shall conform exactly to the contour of the lenses.

The spring metal inserts are permanently secured to the walls of the recessed portions of the plastic frame and have portions 20a and 20b which extend beyond or below the depending frame portions 18 and 19, to lie in close contact with the lateral edges of the lenses; such extensions 20a and 20b passing the arcs of curvature at the sides of the lenses engaged thereby so as to provide for firm engagement and maintenance of the lenses in proper position, as illustrated in Fig. 2. The spring metal inserts are slightly grooved and the edges of the lenses are slightly beveled so that these parts may engage in the manner illustrated in Fig. 3.

The spring metal inserts may be secured in place in any suitable manner, as by the use of rivets or screws passing therefrom into the wall portion of the plastic frame; screws 25 being shown in the present instance.

A lens may be set in place by spreading the spring extensions 20a and 20b of the metal insert to an extent sufficient to permit passage of the lateral contours of the lens. Before insertion of a lens, the spring extensions 20a and 20b lie in the positions indicated by dotted lines, Fig. 2. To permit the necessary flexing of the spring extensions 20a and 20b, the grooves formed in the depending portions 18 and 19 of the skeletal frame are further recessed to a slight extent, as indicated at 18a and 19a, Fig. 2.

The insertion of a lens is so simple that it may be done by the wearer of the spectacles or eyeglasses. This makes it possible for a wearer to substitute other lenses of any character, tinted or of other type, for special conditions requiring eye protection rather than sight improvement. Of course, the replaced or substituted lenses may be of the same refractive character as those originally contained in the mountings.

Any shape lens may be employed with my improved mounting; the only requirement being that the spring metal retaining and supporting members shall have the same shape or contour as the upper parts of the lenses and that the extensions of these spring metal retainers shall depend a sufficient distance below the plastic portion of the whole structure to insure that the lateral edges of the lenses will be properly embraced by such extensions and securely held. The shape of the lens is not important, since my improved retaining and supporting means may be shaped to engage lateral edge portions of lenses of any shape. Figs. 1 and 2 of the drawings illustrate lenses having curved contours, which are not necessarily continuous or struck from a single axis. In practice, there are lenses of many contours, and it is possible to shape the spring extensions 20a and 20b so as to fit lenses having contours different from those illustrated in Figs. 1 and 2. In the fragmentary view, Fig. 4, for instance, I have shown a portion of a lens having a relatively straight lateral edge margin or contour. To engage a lens having a contour of this type, the spring extension will be preformed, as indicated at 20c so as to take over a portion of the lens contour beyond the relatively straight edge portion.

Under some circumstances it may be desirable to augment the retaining value of an extension by providing an end of the same with small flanges, indicated at 26 in the fragmentary view, Fig. 5; such flanges being integral with the spring extensions and very slightly overlying a lens.

In the ordinary forms of screw mountings for lenses and in many other mountings a hole (or holes) has to be drilled in the lens to accommodate the lens screw (or screws), or else it is necessary to provide a notch or recess in the lens edge for cooperative engagement with a complemental part of the frame. By reason of the fact that my improved spring metal mounting receives a lens without the necessity of drilling holes in the lens or of notching the same; merely the usual beveling common in the preparation of all lenses, insertion of a lens may be effected in a minimal amount of time and at a very slight expense.

An important feature of my invention resides in the fact that while my improved spring retaining and supporting means will firmly hold a lens in place, there is no part to obscure the lower edge of a lens; such portion being left entirely free.

The plastic frames of many spectacles and eyeglasses are subject to distortion by heat and by the constant use of the wearer in setting the same in place or removal. My spring metal retaining and supporting members being anchored to a part of the frame and being under constant tension to properly embrace and hold the lenses will have the effect or tendency to maintain the plastic supporting portion of the whole structure in its initial shape without distortion or warping.

While I have described with some particularity the features of my invention and have illustrated an embodiment of the same in the accompanying drawings, it will be understood that such disclosure is for illustrative purposes only and not as a limitation, since modifications may be made therein without departing from the spirit of my invention; all of which is deemed to be within the scope of the appended claims.

I claim:

1. A mounting for removably holding a pair of eye-glass lenses comprising an integral frame-member of non-resilient material having a center nose-bridge portion and laterally extending portions on either side thereof, each of said laterally extending portions being provided with a pair of opposed downwardly extending shoulder-portions forming a more or less arcuate recess, each recess being peripherally grooved to receive the edge of a lens and extending for substantially less than half the periphery of the lens with the downwardly extending shoulder-portions terminating above the major generally horizontal axis of the lens, each groove being deepened somewhat at its ends adjacent the lower ends of the shoulder-portions, and a pair of generally C-shaped clips of resilient metal or the like secured within the grooves of said recesses with the free ends of each clip extending downward somewhat beyond the shoulder-portions and normally tensioned toward each other so that the clearance between them is somewhat less than the dimension of the major generally horizontal axis of the lens, the free ends of the clip being widened somewhat to form lens-embracing flanges and being adapted to be spread apart to permit upward insertion of the lens into the recess and thereafter firmly to clamp against the lateral edges of the lens somewhat below the major generally horizontal axis of the lens, whereby the lenses are securely yet removably held in place with only slightly more than the upper portions of their peripheries confined and with their lower edges wholly free of sight-obstructing surfaces.

2. A construction according to claim 1 wherein the C-shaped clips are peripherally grooved with the side walls of the grooves slightly overlying the edges of the lenses.

3. A construction according to claim 1 wherein the frame-member is integrally molded of synthetic plastic and wherein the C-shaped clips are secured within the grooves of the recesses by screws or like fastening elements and conform exactly to the configuration of the lenses to ensure firm clamping action.

ALLAN M. SILVERMAN.

REFERENCES CITED

The following references are of record in the file of this patent:

UNITED STATES PATENTS

| Number | Name | Date |
| --- | --- | --- |
| 1,825,503 | Carow | Sept. 29, 1931 |
| 2,198,852 | Williams | Apr. 30, 1940 |
| 2,384,867 | Williams | Sept. 18, 1945 |
| 2,389,742 | Rey | Nov. 27, 1945 |
| 2,450,711 | Bouchard | Oct. 5, 1948 |

FOREIGN PATENTS

| Number | Country | Date |
| --- | --- | --- |
| 453,811 | France | Apr. 14, 1913 |
| 78,438 | Switzerland | Jan. 2, 1919 |
| 623,706 | Great Britain | May 20, 1949 |